(12) United States Patent
Contreras et al.

(10) Patent No.: US 8,316,161 B1
(45) Date of Patent: Nov. 20, 2012

(54) TECHNIQUES FOR INDICATING A PASSIVE PATH STATE FOR A DEVICE

(75) Inventors: Cesareo Contreras, Northbridge, MA (US); Helen S. Raizen, Jamaica Plain, MA (US); Michael E. Bappe, Loveland, CO (US); Ian Wigmore, Westborough, MA (US); Arich Don, Newton, MA (US); Xunce Zhou, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 47 days.

(21) Appl. No.: 12/924,572

(22) Filed: Sep. 30, 2010

(51) Int. Cl.
*G06F 3/00* (2006.01)
*G06F 13/00* (2006.01)

(52) U.S. Cl. ............... 710/38; 710/5; 710/8; 710/15; 710/36

(58) Field of Classification Search ............ None
See application file for complete search history.

(56) References Cited

U.S. PATENT DOCUMENTS

2008/0270608 A1* 10/2008 Matsunami et al. .......... 709/225
2009/0182940 A1* 7/2009 Matsuda et al. ............. 711/114

OTHER PUBLICATIONS

SCSI Commands Reference, Feb. 2006, Seagate Technology LLC, [online, accessed on Dec. 3, 2011], URL: http://www.seagate.com/staticfiles/support/disc/manuals/scsi/100293068a.pdf.*
SCSI Status Code, http://en.wikipedia.org/wiki/SCSI_Status_Code, Mar. 13, 2009.
U.S. Appl. No. 12/750,382, filed Mar. 30, 2010.
SCSI Inquiry Command, http://en.wikipedia.org/wiki/SCSI_Inquiry_Command, Jul. 19, 2011.

* cited by examiner

*Primary Examiner* — Scott Sun
(74) *Attorney, Agent, or Firm* — Muirhead and Saturnelli, LLC

(57) ABSTRACT

Described are techniques for indicating a state associated with a device. A request is received over a path for information about a device. A response to the request is sent. The response indicates a state regarding the device on the path. The response has a response status of good and a payload of a varying size. The payload is truncated at a location prior to that at which a device identifier for the device is expected. In accordance with the response, a state regarding the device on the path is determined.

19 Claims, 13 Drawing Sheets

| bit→<br>↓byte | 7 | 6 | 5 | 4 | 3 | 2 | 1 | 0 |
|---|---|---|---|---|---|---|---|---|
| 0 | Peripheral qualifier | | | | Peripheral device type | | | |
| 1 | RMB | Device-type modifier | | | | | | |
| 2 | ISO version | | ECMA version | | | ANSI-approved version | | |
| 3 | AEC | TrmIOP | Reserved | | | Response data format | | |
| 4 | Additional length (N-4) | | | | | | | |
| 5 | Reserved | | | | | | | |
| 6 | Reserved | | | | | | | |
| 7 | RelAdr | WBus32 | WBus16 | Sync | Linked | Reserved | CmdQue | SftRe |
| 8–15 | Vendor identification (ASCII) | | | | | | | |
| 16–31 | Product identification (ASCII) | | | | | | | |
| 32–35 | Product revision level | | | | | | | |
| 36–55 | Vendor-specific | | | | | | | |
| 56–95 | Reserved | | | | | | | |
| 96..N | Vendor-specific parameters (variable number of bytes) | | | | | | | |

Response to inquiry command 352

FIGURE 7

TECHNIQUES FOR INDICATING A PASSIVE PATH STATE FOR A DEVICE

BACKGROUND

1. Technical Field

This application generally relates to data storage systems, and more particularly to techniques used for communicating with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such for path selection and management of the multiple paths, may be handled by a device driver. When the host issues an I/O operation, it may be received by a device driver which facilitates sending and/or receiving transmissions between the application and the data storage system.

SUMMARY OF THE INVENTION

In accordance with one aspect of the invention is a method for indicating a state associated with a device comprising: receiving a request over a path for information about a device; sending a response to said request, said response indicating a state regarding said device on said path, said response having a response status of good and having a payload of a varying size, said payload being truncated at a location prior to that at which a device identifier for said device is expected; and determining, in accordance with said response, a state regarding said device on said path. The device may be a logical device. In accordance with a standard, said response status may always be required to indicate a status of good when a payload is returned in response to said request. The device identifier may be determined using data included in one or more vendor defined fields in said request. The response payload may not be truncated and may include a device identifier so that the path is indicated as active and used to successfully process I/O operations directed to one or more other devices. The state may indicate a passive status with respect to said device and said path. The passive status may indicate that the path is not to be used for sending I/O operations to said device. Prior to sending said request from a host, said path may be established as a recognized path for sending communications from said host to said device. A determination may be made that said host has completed processing to establish said path as a recognized path in accordance with completion of one or more expected commands from said host. The one or more expected commands may be performed as part of initially configuring connectivity between said host and a data storage system. The one or more expected commands may be performed as part of discovery processing. The request may be an inquiry command in accordance with a SCSI standard. The request may include an allocation length specifying a maximum possible length for said payload of said response. The response returned may have a payload with an actual size that is not larger than said allocation length. The response may include a value used to determine the actual size of said payload. There may be multiple paths including said path used for transmitting commands from a host to a data storage system including said device. The host may include an application and a driver. The method may include: sending an I/O request from said application to said driver including multipathing functionality, said I/O request being directed to said device; sending, by said driver, said I/O request over said path to said device; receiving, in response to said I/O request, an indication that said I/O request has failed; sending said request over said path; receiving said response; determining, in accordance with said response, a passive state for said path and said device indicating that said path is currently not available for transmitting I/O operations to said device; and selecting another of said multiple paths for transmitting said I/O operation to said device.

In accordance with another aspect of the invention is a system comprising: a data storage system comprising a computer readable medium with code stored thereon for: receiving a request over a path for information about a device; and sending a response to said request, said response indicating a state regarding said device on said path, said response having a response status of good and having a payload of a varying size, said payload being truncated at a location prior to that at which a device identifier for said device is expected; and a host comprising a computer readable medium with code stored thereon for: sending said request; receiving said response; and determining, in accordance with said response, a state regarding said device on said path.

In accordance with another aspect of the invention is a computer readable medium comprising code stored thereon for indicating a state associated with a device, the computer readable medium comprising code stored thereon for: receiving a request over a path for information about a device; sending a response to said request, said response indicating a state regarding said device on said path, said response having a response status of good and having a payload of a varying size, said payload being truncated at a location prior to that at which a device identifier for said device is expected; and determining, in accordance with said response, a state regarding said device on said path. The device may be a logical device. In accordance with a standard, the response status may always be required to indicate a status of good when a payload is returned in response to said request. The state may indicate a passive status with respect to said device and said path. The passive status may indicate that the path is not to be used for sending I/O operations to said device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5, 6, 7, and 8 are examples illustrating messages that may be exchanged between a host and data storage system in an embodiment in accordance with techniques herein;

DETAILED DESCRIPTION OF EMBODIMENT(S)

Figure 1:
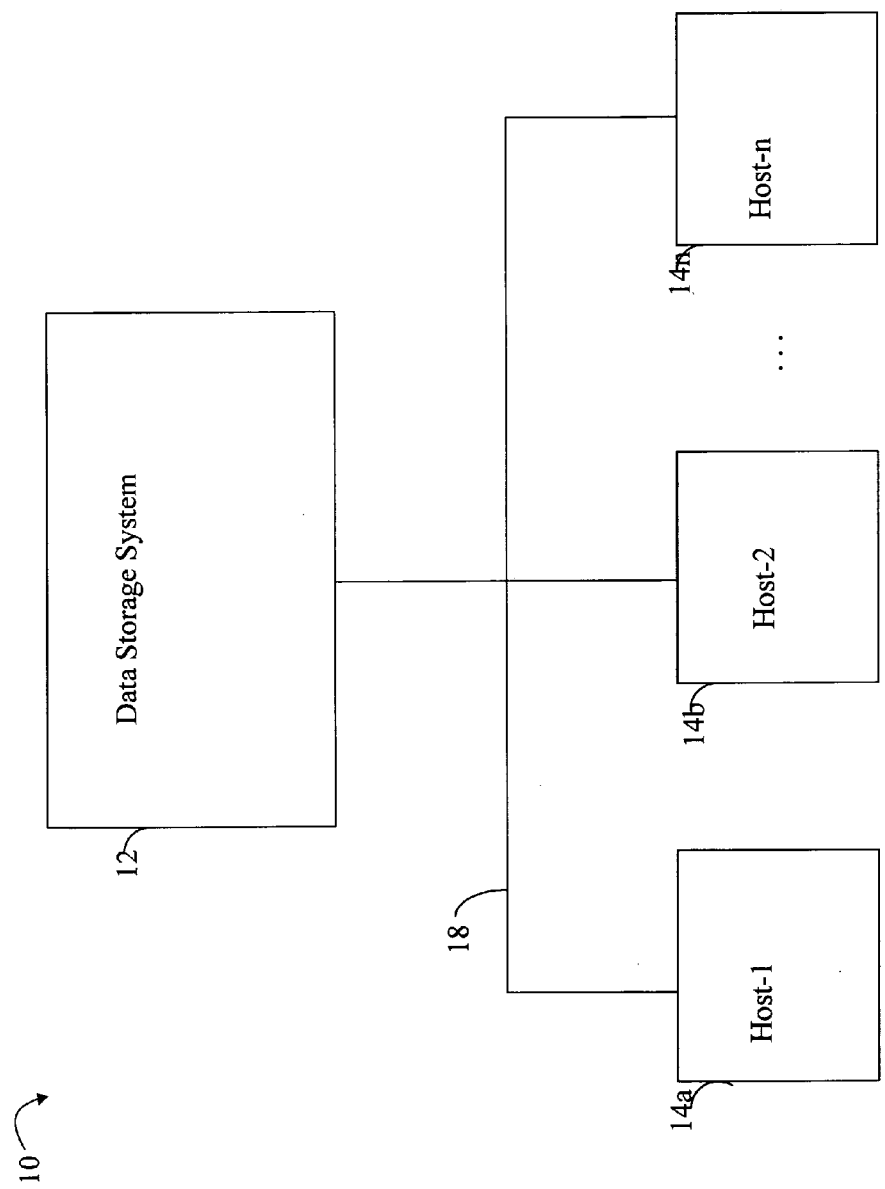
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with the embodiment.

Figure 2A:
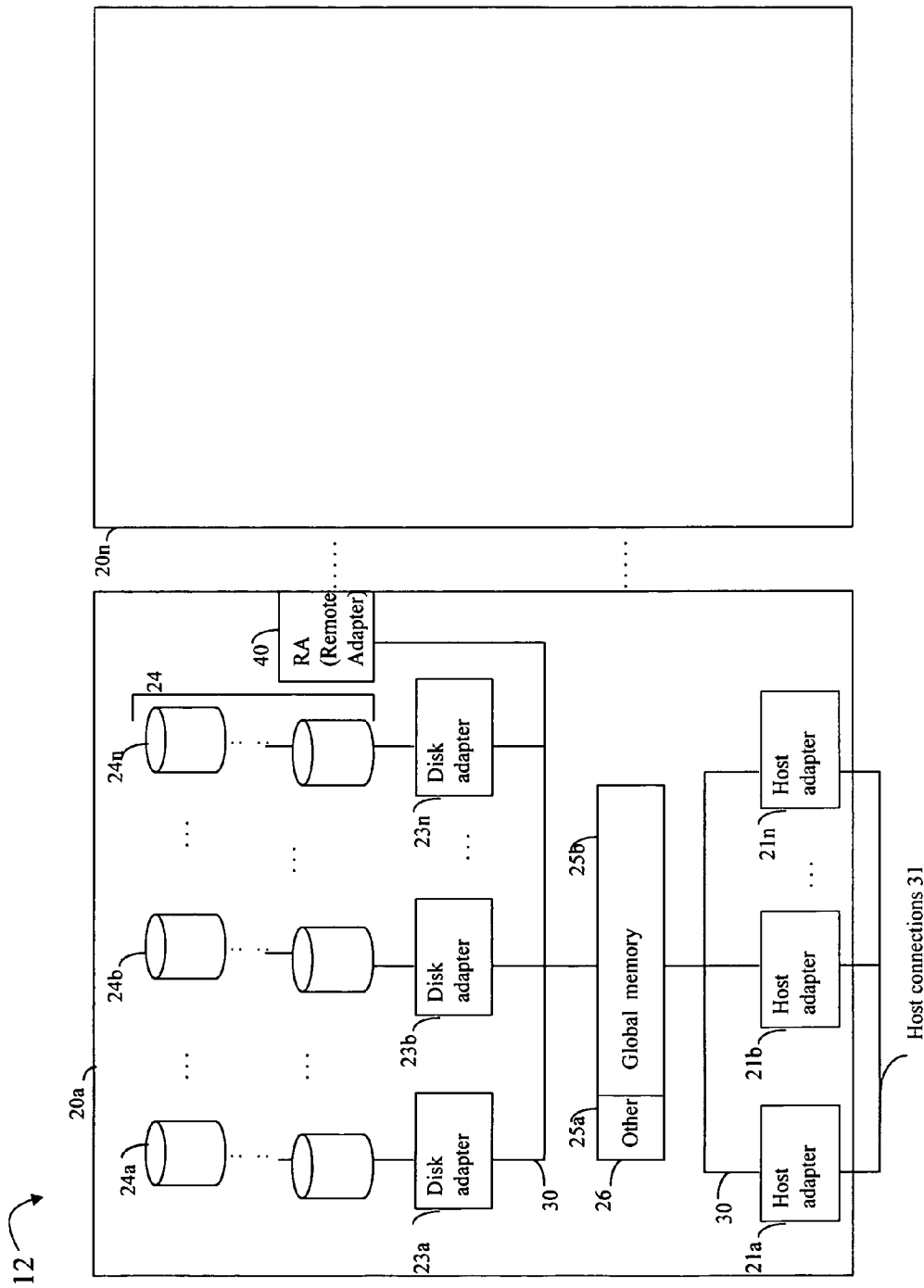
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
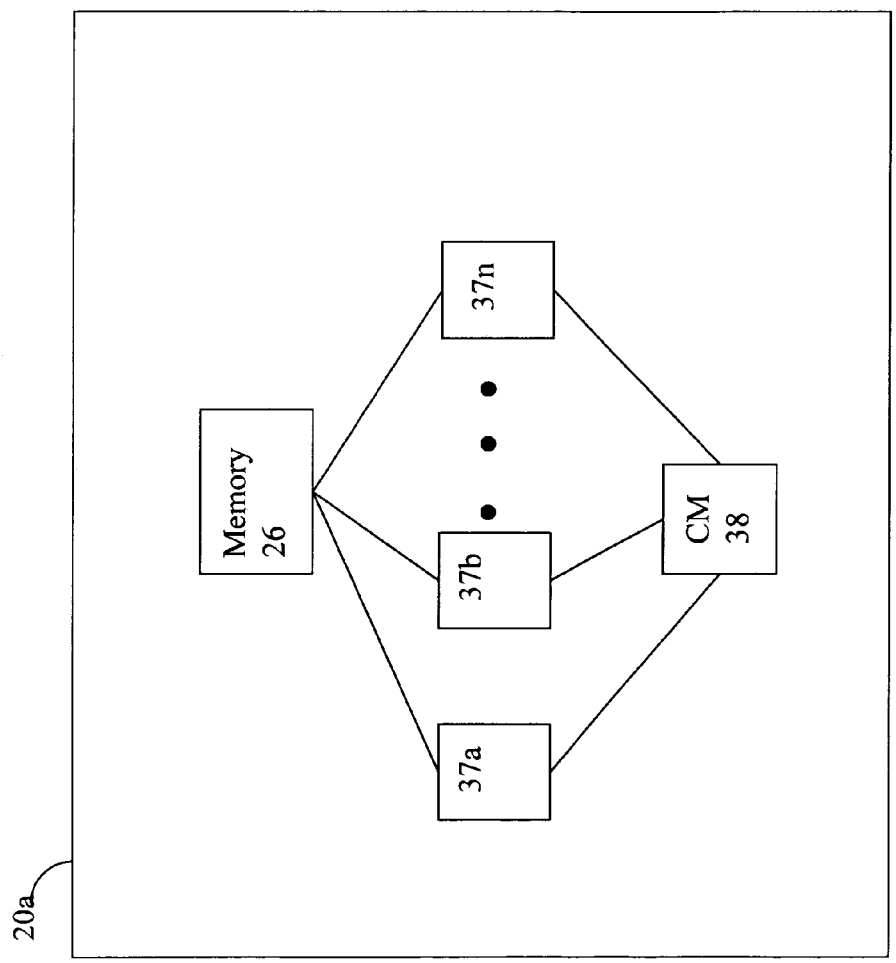
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Figure 3:
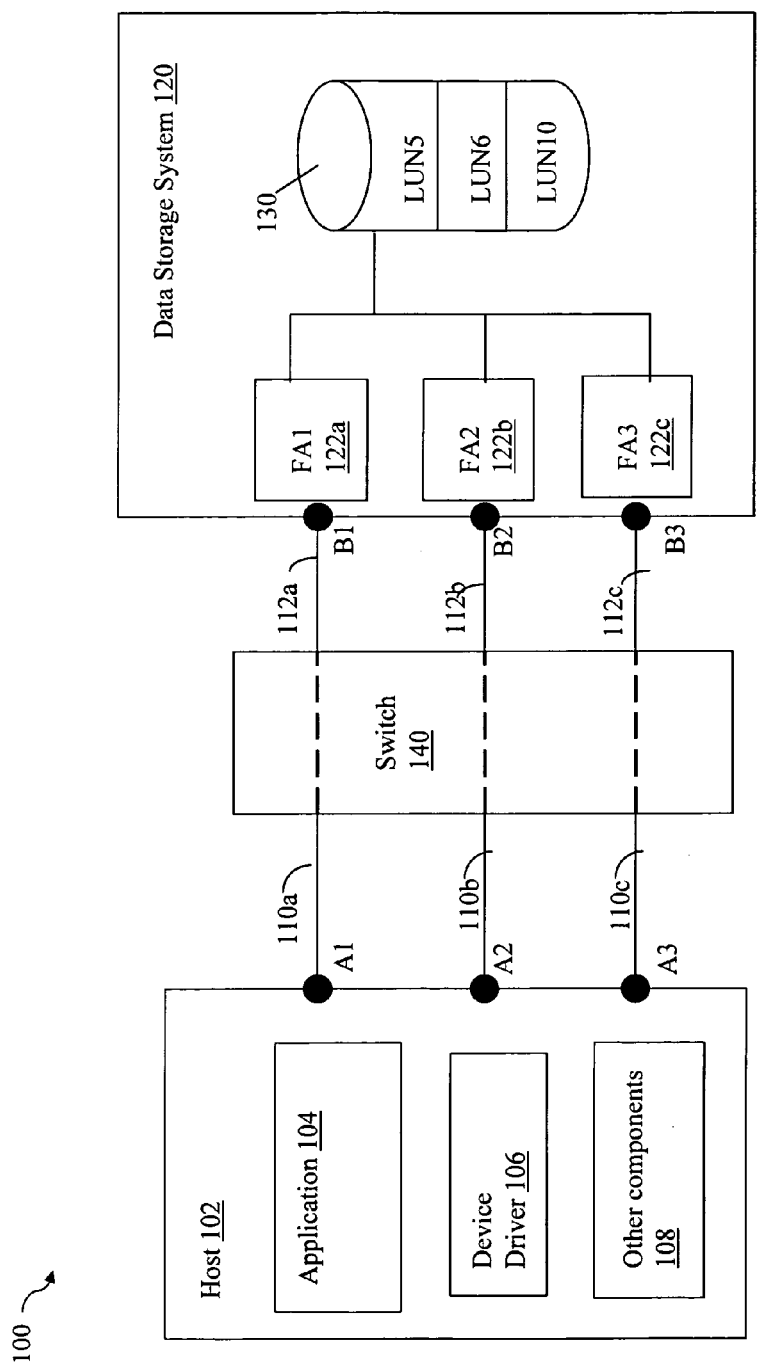
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs-LUN5, LUN6 and LUN10. It should be noted that the example 100 includes only a single host, single data storage system, and a fabric including a single switch for purposes of simplicity to illustrate the techniques herein.

The host 102 may include an application 104, driver 106 and other components 108. An I/O operation from the application 104 may be communicated to the data storage system 120 using the driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The driver 106 may include functionality to perform any one or more different types of processing such as related to encryption, multipathing, mirroring, migration, and the like. For example, the driver 106 may include multipathing functionality for management and use of multiple paths. For example, the driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The driver 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the driver 106 and also below the driver 106. For example, application 104 may issue an I/O operation which is communicated in a call stack including an LVM, the driver 106, and an FC or SCSI driver.

The data storage system 120 may include one or more physical data storage devices, such as device 130, where each such device is configured into one or more LUNs as described above. Each of the LUNs of the device 130 may be configured to be accessible to the host through multiple paths. For example, all LUNs of 130 may be accessible using ports of the three front end directors or interfaces 122a-122c, also denoted respectively FA1, FA2 and FA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the driver 106 may also perform other processing in addition to load balancing in connection with path selection. The driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. Each of the LUNs of the device 130 may be accessible over three paths—a first path represented by A1-B1, a second path represented by A2-B2 and a third path represented by A3-B3.

Although the techniques herein may be used in an embodiment in which the driver resides on a host and manages data storage devices on a data storage system, the driver may also manage data storage devices that are directly attached to the host.

Figure 4:
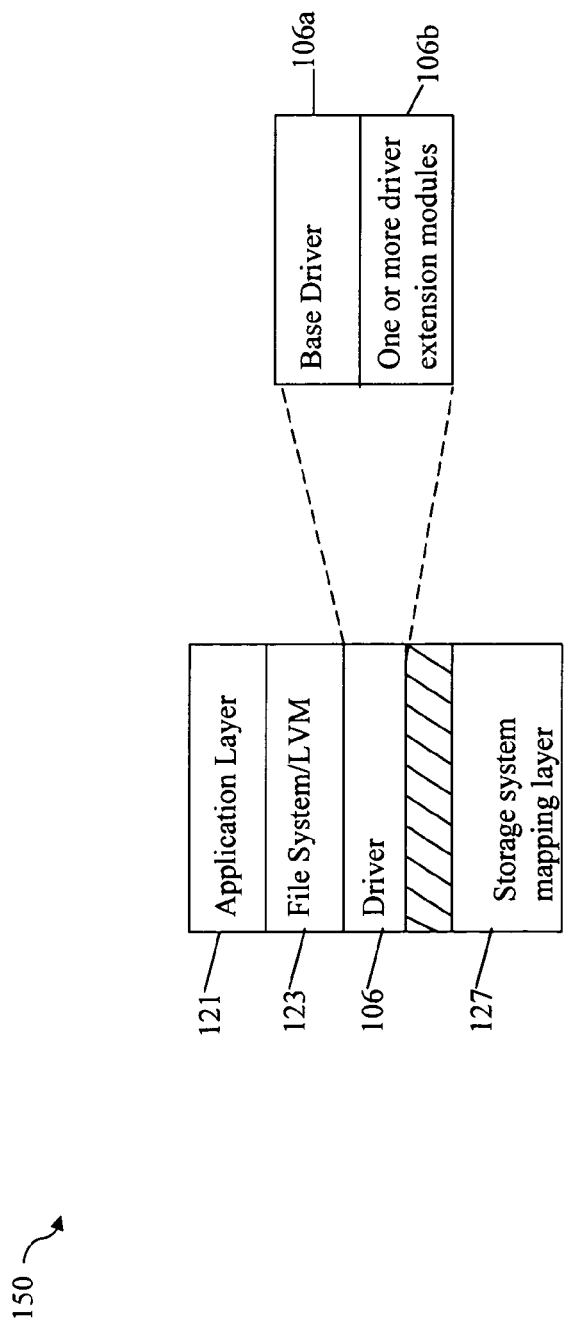
FIG. 4 is an example of different software layers that may included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the driver 106 of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to a LUN which the host may perceive as corresponding to a physical device address (e.g., the address of one of the disk drives) within the storage system 12. Below the file system/LVM layer 123 is the driver 106 which handles processing of the I/O received from layer 123. The driver 106 may include a base driver 106a and one or more driver extension modules 106b. The driver 106 may be included in a commercially available product such as EMC® PowerPath® software. Functionality for performing multipathing operations such as may be performed by EMC® PowerPath® software may be included in one of the extension modules 106b such as a multipath (MP) extension module. As described above, the MP extension module may perform processing in connection with multiple path management and selecting one of a plurality of possible paths for use in connection with processing I/O operations and communicating with the data storage system, such as 120 of FIG. 3. The layer 123 may provide for mapping a LUN as presented by the data storage system to the host to another logical data storage entity that may be used by the application layer 123.

In some embodiments, the data storage system 120 may be an intelligent data storage system having its own mapping layer 127 such that the LUN passed from the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may executed in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices, such as LUNs of the data storage system. Such I/O operations may be directed to the driver 106 after passing through any intervening layers such as layer 123.

In connection with an embodiment in accordance with techniques herein, communications between an initiator port of the host and a target port of a data storage system may include those related to I/O operations and others related to host control operations. I/O operations may include, for example, read and write operations. Host control operations may include those commands which are not performing I/O with respect to a data storage device (e.g., LUN) and include SCSI command such as, for example, inquiry, mode sense, and read capacity.

In following paragraphs, described are techniques that may be used in connection with indicating a state of a path for a particular device. Using such techniques, a path may have an associated state referred to as passive or inactive indicating that the path is not in use or available for I/O operations directed to that particular device. When a path is in such a state, the path may not be used for sending I/O operations directed to that device. When the path is in the passive state, the data storage system including the device may return an error status indicating a failure for any I/O operations which are sent over the path and directed to the device. However, the same path may be successfully used for I/O operations directed to other devices and the device may be accessible through one or more other paths. The passive state may be communicated by the data storage system, such as a data storage array including the device, to a host, or more generally, an initiator using techniques herein. The passive state may indicate that the data storage system is currently not accepting I/O operations for the device on that particular path. When in this passive state, the device and path (including components such as ports, physical connections, and the like) are healthy and operable. However, the data storage system is indicating via this passive state restricted usage of a particular path with respect to I/O operations directed to the device. Thus, the state of passive with respect to the path and device may be communicated by the data storage system to the host, or component thereon such as the driver, by returning a defined set of one or more responses to particular commands or requests allowing the host to detect the passive state for the device and path combination. An active state with respect to a path and a device may refer to the state when a path is used for sending I/O operations to the device. A path for a device may transition between active and passive states, as well as possibly other optional states that may be included in an embodiment. When in the passive state with respect to a particular path and LUN combination, the path may be designated as inactive or not available for sending I/O operations to the LUN. When a path is in the passive state with respect to a particular LUN, the path may be indicated as available only for use in performing host control operations (e.g., inquiry, mode sense, read capacity, etc.) directed to the LUN. If an I/O operation is received over a path for a LUN and the path and LUN combination is in the passive state, the data storage system responds with an error message (e.g., responds with a check condition status code) and does not perform the requested I/O operation. When a path is in the active state with respect to a particular LUN, the path may be used to perform host read/write I/O operations (e.g., SCSI read or write operations to access host data) as well as host control operations (e.g., respond to inquiry and mode sense SCSI commands from the hosts).

Prior to discussing the techniques for representing and communicating the passive status for a device and path combination, following paragraphs will first provide a general discussion of some elements used in connection with such techniques.

In connection with the SCSI protocol and standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another FA having a port with a network address) characterized as a target, destination, receiver, or responder. Each physical connection of a path may be between a first endpoint which is a port of the host (e.g., such as of a host bus adapter) and a second endpoint which is a port of an FA in the data storage system.

Initially, a data storage system may be configured for use by one or more hosts. Part of this configuration processing includes defining what LUNs of the data storage system are accessible or visible to the host over which one or more paths. Discovery processing may then be performed by the host to discover all LUNs accessible to the host and over what one or more paths. As part of discovery processing, the host may issue commands to the data storage system to discover what LUNs are visible to the host over what one or more paths, discover information about each LUN, and the like. For example, the host may issue a first command from a host initiator port (e.g., Report LUNs) to obtain a list of all LUNs visible from the host initiator port. Subsequently, the host may also send a sequence of one or more commands to each LUN from the host initiator port to gather additional information about the LUN and path, perform a path test to determine whether a LUN is currently accessible to the host over the path such as for I/O operations, and the like. For example, the host as initiator may send the following sequence of SCSI commands over a path, such as from a host port to a target data storage system port, as part of discovery processing:

1. Test unit ready (TUR)
2. Standard Inquiry page 0
3. read capacity
4. mode sense
5. Inquiry VPD page 0x83

In the foregoing command sequence, TUR provides a means to check if the logical unit is ready, mode sense reports information about the LUN to the initiator, read capacity obtains storage capacity information about the LUN, and the standard inquiry page 0 provides general information about the LUN and also serves as a path test to determine whether the LUN is accessible to the host over the path from the host initiator port to the data storage system target port. With the standard inquiry page 0 command, the page field of the SCSI command data block is set to 0 and the EVPD field of the SCSI command data block is set 0 to return a standard set of data as described in more detail elsewhere herein. Inquiry VPD (Vital Product Data) page 0x83 may also be used in a manner similar to the standard inquiry page 0 command (e.g., denoted in 2 above) to obtain information about the LUN. With the inquiry VPD page 0x83 command, the page field of the SCSI command data block is set to 0x83 and the EVPD field of the SCSI command data block is set 1. More generally, the foregoing command sequence illustrates an exemplary sequence performed in an embodiment as part of discovery processing to recognize or establish a path over which a LUN may be accessed. After the foregoing has been successfully executed, the path may be characterized as a recognized path by the host over which to access the LUN. The foregoing sequence of 5 instructions represents one sequence of commands that may be expected to be completed successfully in order for a path to be considered recognized or established.

In an embodiment in accordance with techniques herein, an additional one or more commands may also be included in the expected command sequence of instructions as part of path recognition. The additional commands may be in accordance with processing performed by the driver including multipathing functionality as described herein. For example, the driver may issue commands in connection with SCSI reservation protocol exchanges. In this case, path recognition for a particular device may also include successfully executing a SCSI reservation registration command. The reservation registration command may be used by the host to register for subsequent reservations on a particular path for a device where the path may be used to subsequently send commands to the device over the path. In connection with techniques herein as described in more detail elsewhere, after the host successfully executes the reservation registration command in the embodiment using the multipath functionality, this may be an indication to the data storage system that the host has recognized the associated path. Subsequently, the data storage system may perform processing as needed in accordance with techniques herein to indicate that the path for the particular LUN is in a passive state.

As will be described in more detail below, it should be noted that, more generally, an embodiment in accordance with techniques herein may be used in connection with any sequence of commands which, when executed successfully, indicate that a path is recognized or established by the host for use in accessing the LUN.

Subsequent to recognizing a LUN as accessible over a path, a problem may occur with the path such as a problem with a physical wiring or network connection, host bus adapter or initiator port of the host, and the like, so that the path is inoperable and fails a path test. The path test may be issued in connection with the standard inquiry page 0 and/or other commands. At this point, the host may store information indicating that the path has a bad or failing status reflecting the inability to access the LUN and possibly other LUNs. At a later point, the host may again perform a path test over the path to determine whether the problem of the path has been corrected. If so, the host may accordingly update information about the path to indicate the path as having a good status and may be used in connection with I/Os and other operations for the LUN. Thus, in an embodiment in accordance with techniques herein as described in more detail below, once the path with respect to accessing a particular LUN has been recognized, the host may detect at a later point in time that the path has failed in any one or more different ways and is unable to be used in connection with transmissions to the LUN. Subsequently, the host may then perform processing to automatically retry the path for sending communications to the LUN.

In connection with multiple paths as may be managed and used by the MP driver module described above, techniques may be performed to allow the MP module to determine whether two paths are providing accessibility to the same or different LUNs. For example, a host may use the SCSI standard inquiry page 0 command for this purpose. One of the items returned in response to such a command is information that may be used as a device identifier associated with a particular LUN for which the command was issued. The foregoing device identifier associated with the LUN may be used to uniquely identify the LUN. It should be noted that the level of uniqueness is with respect to all LUNs that may be used by the host across multiple data storage systems, such as multiple data storage arrays and other systems. Therefore, consider the example where the host issues a standard inquiry page 0 command over path 1 to a LUN and receives in the return payload a first device identifier. The host then issues a second standard inquiry page 0 command over path 2 to a LUN and receives in the return payload a second device identifier. If both the first and second device identifiers are the same, then both path 1 and path 2 are accessing the same LUN (e.g., providing access to the LUN over different paths).

Figure 5:
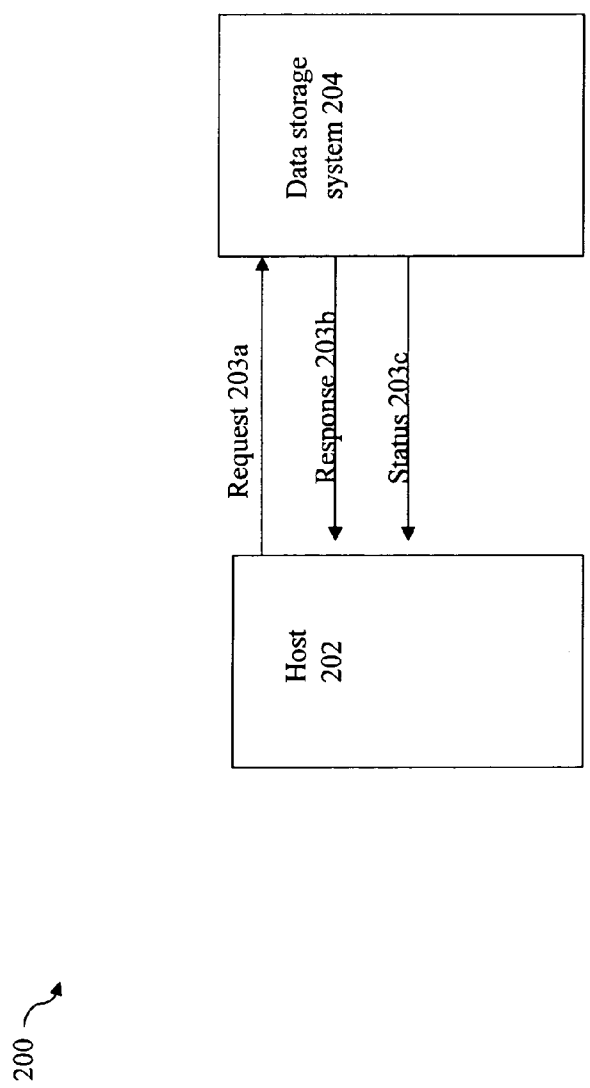

Referring to FIG. 5, shown is an example of messages as may be exchanged between a host and data storage system in an embodiment in accordance with techniques herein. The example 200 illustrates messages exchanged between the host 202 and data storage system 204 in connection with a SCSI inquiry command issued by the host and represented by 203a. In response to the inquiry command, the data storage system 204 may send a response 203b and a status message 203c.

Figure 6:
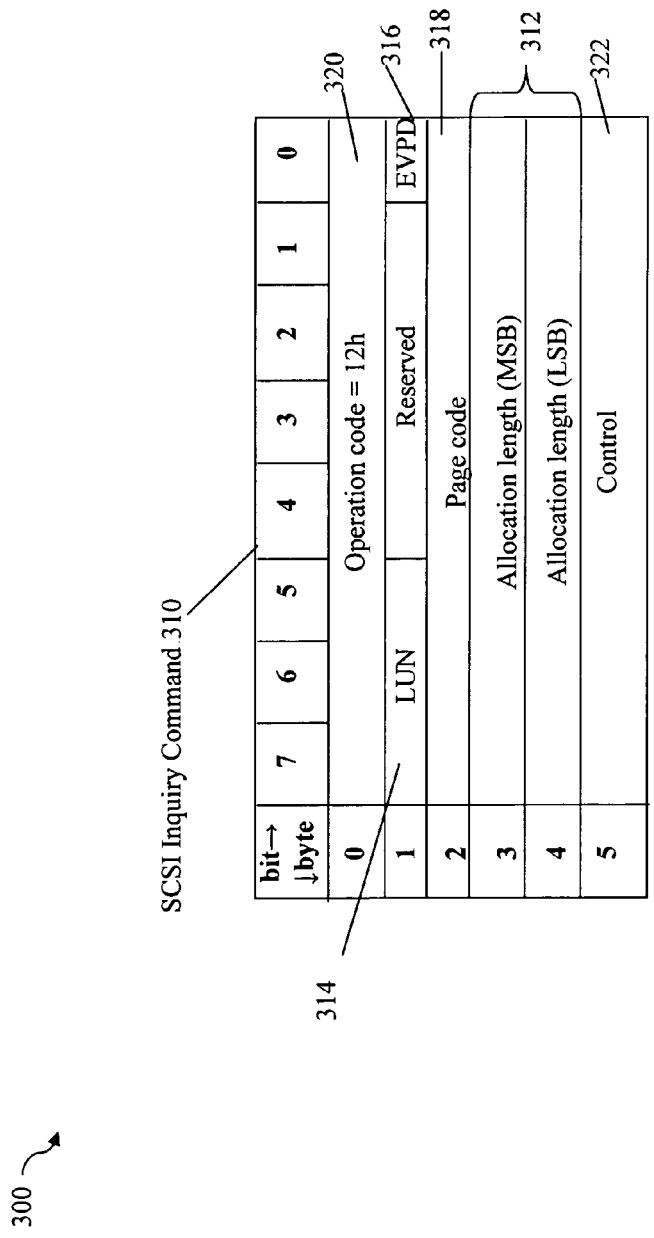

Referring to FIG. 6, shown is an example of a command data block or payload of a SCSI command as may be used in an embodiment in accordance with techniques herein. The SCSI inquiry command 310 may include data in accordance with the illustrated format. A message in accordance with format 310 may be sent by the host to the data storage system as illustrated by 203a of FIG. 5. The command 310 may specify the following fields: operation code 320 (e.g. indicating the inquiry command code), a LUN 314, EVPD (e.g., vital product data) indicator 316, page code 318, allocation length 312, and control 322. The format of 310 is in accordance with the SCSI standard. The standard page 0 inquiry command as described herein has the page code field 318 set to 0 and the EVPD field 316=0. A standard page 0 inquiry command may be sent as part of the sequence of instructions mentioned above for path recognition. The allocation length fields 312 specify an upper bound or maximum size of the response payload that may be returned by the data storage system as described in more detail below. In connection with 312, MSB denotes the most significant byte of the allocation length and LSB denotes the least significant byte of the allocation length. The EVPD field 316 in combination with the page code field 318 identify the type and amount of information that is returned in the response. Additionally, certain portions of the format are indicated as reserved in accordance with the SCSI standard. As will be appreciated by those skilled in the art, suitable data for the other fields may be specified even though not discussed in detail herein.

Referring to FIG. 7, shown is an example of a data format of a response to the inquiry command as may be used in an embodiment in accordance with techniques herein. The example 350 illustrates a format in accordance with the SCSI standard for the payload portion of a response message. A message in accordance with format 352 may be returned to the host as illustrated by 203b of FIG. 5. As represented by the variable byte offset field indicators 351, the size of the response payload to the inquiry command may vary depending on the length of the vendor specific parameters field 356. Element 351 denotes the field 356 as having a last byte located at any offset from 96 to N (e.g., field 356 may be 1 or more bytes). As described above in connection with FIG. 6, the inquiry command may specify an allocation length 312 indicating a maximum size of the payload of the response (e.g., the maximum size of the data returned having format 352). The response 352 may include the additional length field 354 that specifies the actual length in bytes of the parameters or following data. Thus, field 354 indicates the actual size of the response payload following field 354. The value indicated by field 354+4 bytes should not exceed the maximum size specified by the allocation length 312 of FIG. 6 in an embodiment denoting byte locations or offsets which are zero-based.

In one embodiment, the device identifier for a LUN as may be used to uniquely identify the LUN among all LUNs in all data storage systems used by the host may be specified using information in the vendor specific parameters field 356. Field 356 may be a variable length in accordance with the amount of information supplied by the particular data storage system vendor. The field 356 may include, for example, a data storage system identifier, such as a data storage system serial number, and a device number. The serial number may be, for example, a 5 byte field and include a serial number of the data storage array or other type of data storage system in which the LUN identified is included. The device number may be, for example, a 4 byte field. The data storage system serial number in combination with the device number may be used to form the device identifier for the LUN. An embodiment may use all, or portions of the foregoing serial number and device identifier, in forming the device identifier. For example, an embodiment may concatenate the two items to form the device identifier, concatenate or otherwise use one or more bytes or bits of each to form the device identifier (e.g., low 2 bytes of serial number (in ASCII), low 3 hex digits of device number (in ASCII), two most significant digits of serial number (in binary coded decimal). More generally, an embodiment may use any suitable information and technique to uniquely identify and distinguish between LUNs. For example, a random number may be generated and used as the device identifier. It should also be noted that the information used to determine the device identifier may be included in one or more other fields of the response 352. For example, a portion of the serial number and/or device number may be stored in the vendor-specific field 358 and used alone, or in combination with other information to determine the device identifier. As will be appreciated by those skilled in the art, suitable data for the other fields of 352 may be specified even though not discussed in detail herein.

Figure 8:
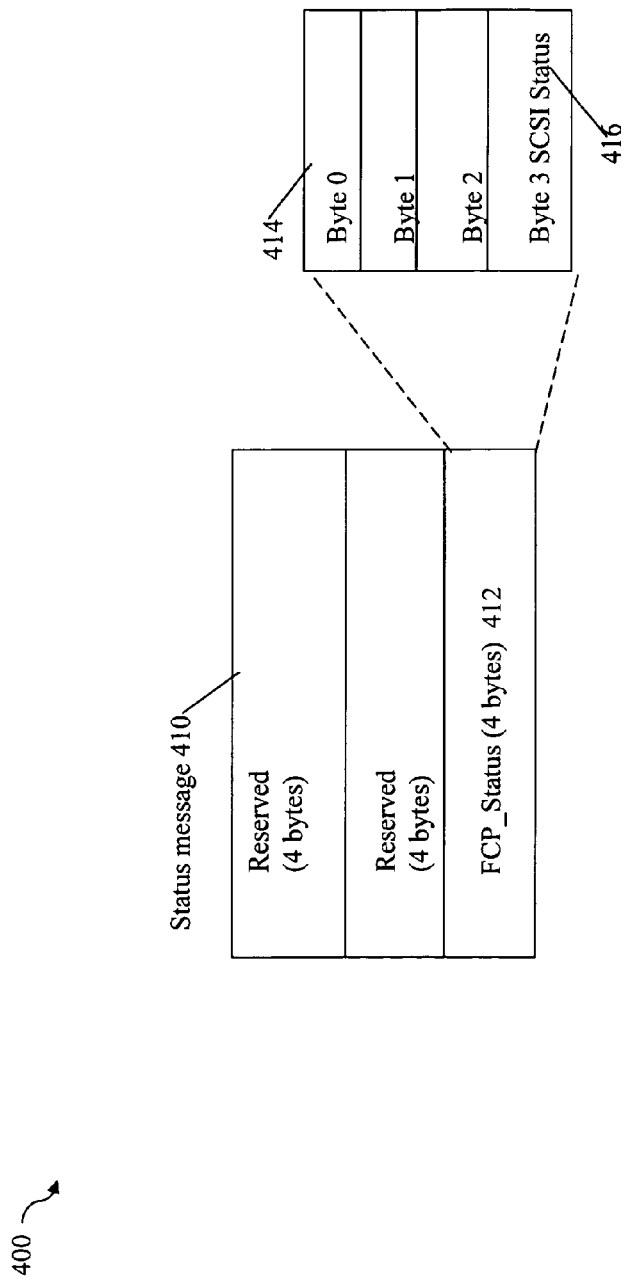

Referring to FIG. 8, shown is an example of a data format of a status message payload sent in response to the inquiry command as may be used in an embodiment in accordance with techniques herein. The example 400 illustrates a format in accordance with the SCSI standard for the payload portion of a status message. A message in accordance with format 410 may be returned to the host as illustrated by 203c of FIG. 5. The status message 410 includes 8 reserved bytes followed by a 4 byte FCP_Status field 412 indicating the status of the inquiry command execution at the data storage system for the requested LUN. Element 414 provides additional detail regarding the field 412 and indicates that the last byte thereof, field 416, indicates the status of the inquiry command execution. In accordance with the SCSI standard, the only acceptable value for the SCSI status field 416 when returning an inquiry response payload is a good status indicating that the data storage system has successfully completed the inquiry command. Although the SCSI standard defines other status codes and states (e.g., check condition indicating that the requested command was not successfully executed (e.g. an error occurred when executing the command or that the command was not executed), busy indicating that the device cannot accept commands right now, and the like), returning any other status indicator besides good (e.g., value 00 in hex) when returning an inquiry response payload is not in accordance with the standard. Thus, a data storage system which is in compliance with the SCSI standard and returns an inquiry response payload and status message in response to the inquiry command only returns a good status indicator in the status message.

Furthermore, it should be noted that the SCSI standard defines only three instances where a status of "check condition" may be returned in response to an inquiry command. In these three cases, no response payload is returned. As noted elsewhere herein, check condition is one of the defined status codes that may be returned in accordance with the SCSCI standard. In these three instances, check condition indicates that the inquiry command has not been executed. The foregoing three instances may be summarized as follows.

1. When the inquiry command data block has the page code field set to a value other than zero and the EVPD bit is set to zero (e.g. has an invalid combination of settings for the page code field and EVPD field), the inquiry command is terminated with a check condition status.

2. If the data storage system is unable to formulate a response and return the requested inquiry data, a check condition status is returned.

3. If the inquiry data changes for any reason since the last time an initiator, like the host, has issued an inquiry command, the data storage system establishes a "unit attention condition" so that a subsequently received inquiry command from that initiator results in a check condition status returned with additional information as may be encoded in additional byte(s) returned with the status indicating that the inquiry data has changed.

Based on the above, the SCSI standard specifies that a status code of good is returned with the response payload when responding to any inquiry command unless one of the three exceptions cited above occurs. In the case of the three exceptions, the status returned is alternatively required to be check condition with no response payload.

In an embodiment in accordance with techniques herein, the multipathing functionality as may be embodied in the driver described above may determine multiple paths to the same LUN using the information returned from the standard inquiry page 0 commands. An embodiment may insulate an application from the fact that multiple paths may be in use by presenting the application with a single device. The driver may then select a path for use with an I/O as described above should that device be accessible on multiple paths. Subsequently, as the number of paths and the availability of the paths may change over time, the application may also be unaware of such changes so long as at least a single path is available to the device.

At times, it may be desirable to indicate temporarily that a particular path is not to be used for I/Os directed to a particular device, such as a particular LUN. The path may be used for sending I/Os to other devices but it may be desirable to disable or render the path inactive for I/Os for the device. In this case, the device and path are healthy. However, the particular combination of device and path specify that the path is not to be used for I/O operations for the device. The path may be used in connection with other SCSI commands for the device, but not for I/O operations. The foregoing may be characterized as a passive or inactive state with respect to the path for the particular device. It may be desirable to transition into such a state with respect to the path for the device for a variety of different uses. Some examples are described in more detail in following paragraphs where it may be desirable to render a path as passive or inactive with respect to a particular device but not for other devices. Prior to discussing these examples of when it may be useful and desirable to set a path to such a passive state, techniques are described which provide for transitioning the path to the passive state from the host's point of view for the particular device.

What will now be described are techniques which provide for selectively transitioning a path to a passive state to render the path inactive with respect to performing I/O operations for a particular device.

As described above, a host may perform an expected sequence of commands issued to the data storage system for a LUN and one or more paths over which the LUN may be accessed as part of discovery processing. The data storage system may track and detect when such a sequence of commands has been received from the host for the LUN over each such path in order to determine when the host has completed path recognition for the LUN. For example as described above in one embodiment, a path to a LUN may be recognized by the host when the host has successfully completed execution of the SCSI commands transmitted over the path to the data storage system including the LUN: TUR, standard inquiry page 0, read capacity, mode sense, inquiry VPD page 0x83 and also possibly one or more other commands, such as the SCSI reservation registration command. It should be noted that the path for which recognition is performed is the path over which such commands are transmitted to the data storage system from the host (e.g. more generally to the target from the initiator). After the data storage system has detected successful completion of the expected sequence of commands from the host indicating path recognition, the data storage system may at any subsequent point in time transition the path for this LUN to the passive or inactive state.

As part of setting the path for the LUN into the passive state and communicating such a passive state to the host, the data storage system may execute code thereon which performs processing that will now be described to return appropriate responses to subsequent commands received from the host. Based on the responses and associated data received for these commands subsequent to completing path recognition, the host may determine the passive state of the path for the particular LUN. Once the data storage system has detected that the host has successfully executed the expected command sequence associated with path recognition, it may be desirable to set the path for the LUN into the passive state. At this point, the data storage system may wait for the next command or operation, such as the next SCSI command, received for the LUN on the path. For any I/O command received on the path directed to the LUN, the data storage system does not execute the I/O operations and returns an error or failure condition indicating that the I/O operation failed. For example, the data storage system may return a check condition status in accordance with the SCSI protocol indicating the I/O operation failure. At this point, the host, or more specifically the driver which may have facilitated transmission of the I/O operation, may perform processing to try and determine further information about the I/O failure. The host may issue an inquiry page 0 command, such as the standard inquiry page 0 command described above (e.g., page code field=0 and EVPD field=0 in SCSI command block). The host may issue this inquiry command in connection with performing a path test to the LUN to determine if the path to the device is good. In other words, the I/O failure may have been caused by more than one condition and the host may perform processing to try and assess the cause of the failure and state of the path, device, and the like. In response to the inquiry page 0 command, the data storage system may return a specially formed response payload and status for use in accordance with techniques herein where the payload and response are compliant with the SCSI standard and protocol.

The inquiry response payload has a format as described and illustrated in FIG. 7. The data storage system may return a response payload of varying length but no more than the size of the allocation length indicating in the standard inquiry page 0 command. In accordance with techniques herein, it may be determined where the device identifier is expected to be located within the payload response, such as at offset X within the payload. A size may be selected for the response payload so that the payload has a size which is less than X. In other words, the response payload has a size which is truncated to a length less than X so that the device identifier and any subsequently located information in accordance with the format of FIG. 7 is omitted due to the truncated length.

Figure 9:
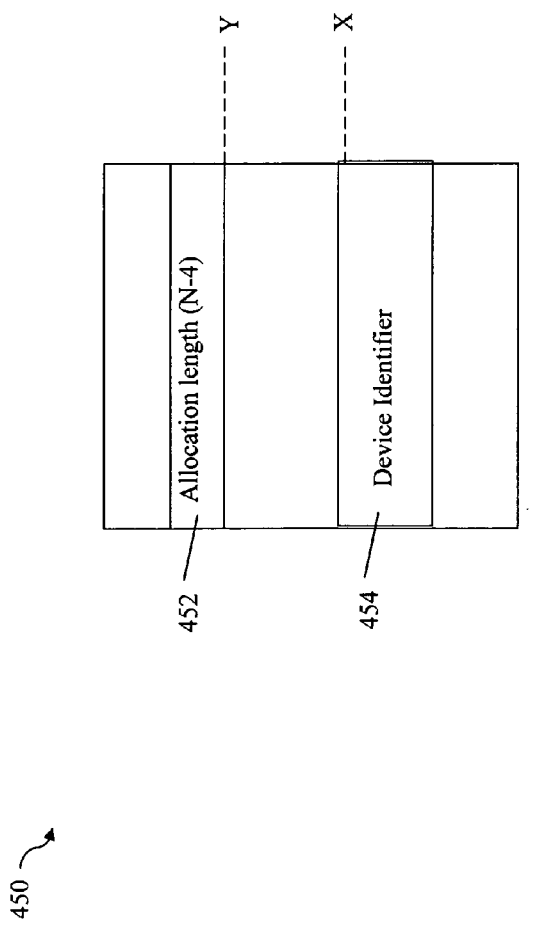
FIG. 9 is an example illustrating a special truncated response payload that may be used in an embodiment in accordance with techniques herein.

Reference is made to FIG. 9 to further illustrate the inquiry response payload just described. The example 450 includes an inquiry response payload in accordance with the format as described in FIG. 7 with the allocation length field 452. The field 452 indicates an amount of payload data which follows field 452. Element Y indicates that the field 452 ends at payload offset Y. It is noted that Y is byte offset 4 using a zero-based byte count for the format of FIG. 7. However, the variable Y is used as a more generalized representation. Element X indicates a location or offset as to where the device identifier 454 may be stored within the response payload in accordance with the format of FIG. 7. The location X may vary in accordance with the information used by each vendor in forming the device identifier and where such information is located in the response payload. In accordance with techniques herein, the data storage system may return a response payload having a total size or length in bytes which is more than Y and less than or equal to X, where X and Y are expressed in this example using a zero as the starting or first offset. In this case, the device identifier 454 is expected to be located beginning at offset X in the response payload. However, the actual payload size will not be large enough to include the device identifier thereby resulting in truncation of the device identifier and any expected information subsequent. It should be noted that the response payload may have to include the allocation length 452 in accordance with the current standard under consideration. To further illustrate with reference to FIG. 7, assume the device identifier is expected in a response payload at byte offsets 100-104. In this case, the data storage system may return a response payload having a size at least 5 bytes which is large enough to store data of bytes 0-4 and the total payload size may also be 100 bytes or less since the device identifier begins at byte offset 100 (e.g., the 101$^{st}$ byte of the response payload). Thus, a response is returned having a payload which is truncated at an offset prior to that at which the device identifier is expected in accordance with the response payload format.

It should be noted that whether or not the response payload is required to include the actual length may vary with the particular standard. For example, an embodiment in accordance with techniques herein may use a command other than SCSI inquiry command, may be in accordance with another standard or protocol than as described herein, and the like.

It should be noted that in an embodiment in which the device identifier is based on multiple fields of data which may not be stored in consecutive locations in accordance with the format of FIG. 7, the value of X may be determined with respect to the location of the first of such multiple fields.

In addition to returning a special response payload that is truncated as described above, the inquiry response status indicates a good status. Upon receiving an inquiry response payload which has been truncated as described herein (e.g., truncated at an offset or location prior to that at which the device identifier is expected in accordance with the response payload format) in combination with the good status indicating that the path to the device is good, the host may determine that the path for the LUN is in a passive state. In one embodiment, the driver may receive the foregoing truncated inquiry response payload and good status following an I/O failure. At this point, the driver may determine the path to have a passive state setting and, assuming the LUN is recognized and available on multiple paths, just use a different path for directing I/Os to the LUN. The driver may then also attempt to issue the I/O to the LUN on a different path and this I/O operation may execute successfully. If an application has issued the I/O, the driver may determine the path for the particular LUN to be in the passive state and simply use an alternative path for I/Os for the LUN. Thus, the application does not receive an I/O failure, a false indication that the device or LUN is bad, and the like.

At a later point in time, the data storage system may set the state of the path for the LUN from passive to active and no longer return the specially formed inquiry response and status indicating that the path may again be used for I/Os directed to the LUN. The driver may at various times perform processing to determine whether the state of the path for the LUN has transitioned from passive to active. Such processing may include reperforming a path test. In one embodiment, the path test may include sending the standard inquiry page 0 command to see whether special formed response payload and good status are received. If the inquiry response payload is truncated and status is good as described in connection with the techniques herein, the host may determine that the particular path is in the passive state with respect to transmissions directed to the LUN. If the inquiry response payload is not truncated as described herein, the host may determine that the path is no longer in the passive state and is now in the active state. The host may optionally, perform other processing such as attempting to resend an I/O directed to the LUN on the path.

It should be noted that the determination of when a device is established or recognized on a particular path may be made which respect to any sequence of expected commands. After such commands have been successfully executed as detected by the data storage system, the data storage system may determine that the host and driver have recognized the path for the LUN. At any point subsequent to path recognition for a LUN, the data storage system may set the path for the LUN to the passive state. In this state, any subsequent I/Os which are directed to the LUN and transmitted over the path result in a response to the host indicating I/O failure. Additionally, the data storage system also responds to any standard inquiry page 0 commands with the specially formed response payload (e.g. having the truncated length which is less than the location or offset at which the device identifier is expected) and good status. When the data storage system decides to transition the path for the LUN out of the passive state, the data storage system may cease sending the specially formed response to the inquiry command and may no longer automatically fail all I/O operations received on the path for the LUN.

By waiting to transition the path for the LUN to passive state until after path recognition, the host may perform subsequent processing to retry the path at a later point in time to detect the transition out of the passive state to another state, such as the active state, where the path may again be used for sending I/Os to the LUN. As described elsewhere herein in more detail in an embodiment in accordance with techniques herein, once the driver on the host successfully completes path recognition, the driver, such as a multipathing driver, may periodically either attempt to send an I/O operation on the path or otherwise perform a path test for the path. However, if the path is never successfully recognized, the driver might not try to send an I/O operation or perform a path test again without some manual intervention to configure new paths. Thus, by waiting until after successful path recognition, an embodiment in accordance with techniques herein may assure that the driver automatically detects a state change of no longer passive without requiring human intervention.

Some examples will now be described of when it may be desirable to render a path as passive or inactive with respect to a particular device but not for other devices in an embodiment in accordance with techniques herein.

Figure 10:
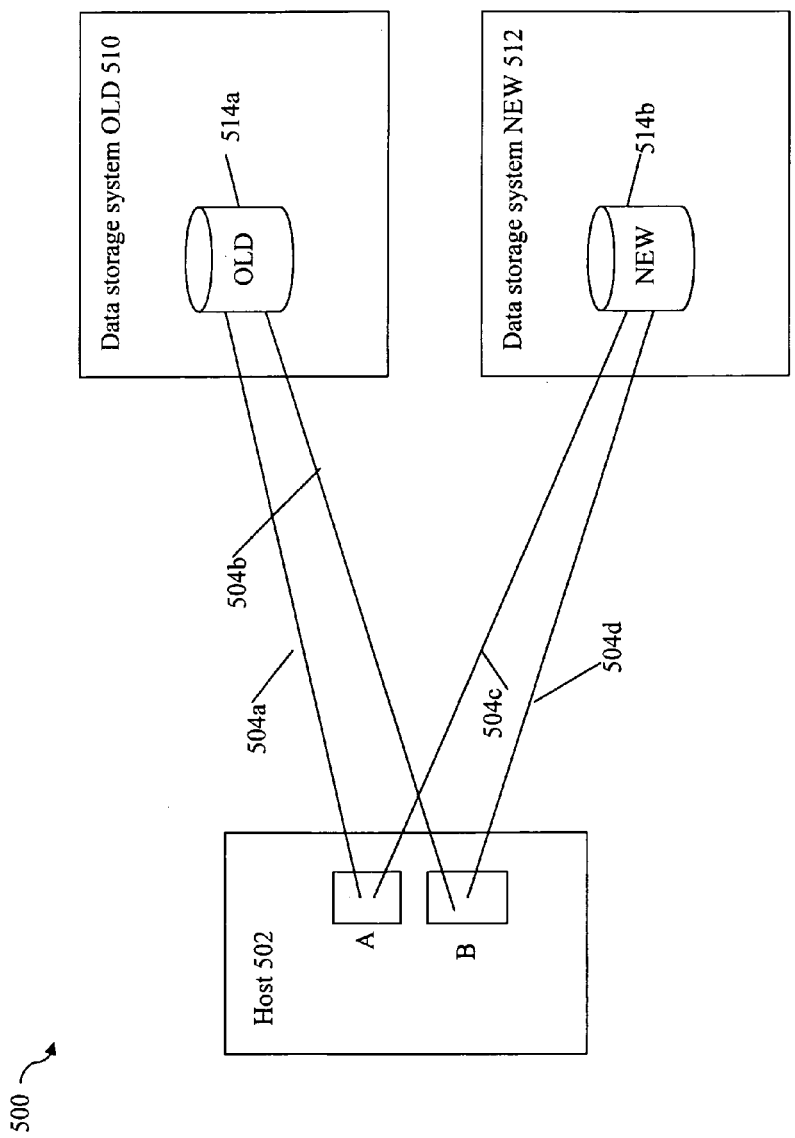
FIGS. 10 and 11 are examples illustrating use of the techniques herein in various embodiments.

As an example, consider the arrangement of FIG. 10. The example 500 includes a host 502, data storage system 510 (OLD), and data storage system 512 (NEW). Data storage system 510 includes device 514a and data storage system 512 includes device 514b. In the example 500, data may be in the process of being migrated from device 514a to device 514b such as may be the case where a customer is upgrading from data storage system 510 to 512. Part of this process may include migrating the data to the newer system 512 and its device 514b from device 514a. During this migration process, the host 502 may be online and accessing data of the systems 510 and 512. The host has recognized and uses paths 504a and 504b to access device 514a. Similarly, the host has recognized and uses paths 504c and 504d to access device 514b. Paths 504a and 504c may use the same host initiator port A and paths 504b and 504d may use the same host initiator port B. Devices 514a and 514b are configured to both have a same first device identifier. However, this may be only temporary until the migration has completed and then device 514a is brought offline. In a similar manner, each of the data storage systems 510 and 512 are configured to have the same data storage system identifier. However, the data storage systems 510 and 512 are configured to ensure that each port thereof has a unique port identifier. That is, each port of the systems 510 and 512 is associated with a port number that uniquely identifies or distinguishes the port from all other port identifiers associated with ports of the systems 510 and 512. During the migration process, the host, and the multipath module of the driver of the host, is able to distinguish between the paths to the devices 514a and 514b based on the unique combination of data storage system identifier and data storage system target port identifier even though the paths may use a same host initiator port. In other words, ensuring that the data storage system port identifiers across systems 510 and 512 are unique with respect to one another allows the host to differentiate between the four paths to the devices 514a and 514b.

During the migration process, the host may have access to both devices 514a and 514b on the illustrated paths. However, it may be desirable to disallow I/O operations to the new device 514b until the data migration process is complete. Setting the two paths 504c and 504d to the passive state with respect to I/O operations for device 514b is one way in which this may be achieved using techniques described in following paragraphs. During the migration, the paths 504a and 504b may be used in connection with I/O operations from the host and remain in the active state while paths 504c and 504d are in the passive state. After the migration, the paths 504c and 504d transition from the passive to an active state where I/O operations for the device 514b are allowed. After the migration, the paths 504a and 504b may be set to passive. Setting paths 504c and 504d for device 514b to the passive state during the migration and communicating such state information to the driver of the host performing multipath management allows the driver to access the appropriate device 514a to service host I/Os. The driver, or more generally the host, may detect the transitioning of paths 504c and 504d out of the passive state by sending I/Os on the path to the LUN and/or reissuing a standard inquiry page 0 command and examining the response and status returned.

As another exemplary use of the techniques herein, a component on a host, such as a host bus adapter or host port thereof, may be defective in that it repeatedly sends one or more commands, such as a reset command, to one device on one path. In this example, the defective host bus adapter may repeatedly send commands to only the particular combination of path and device. In this case, it may be desirable to set the path to the passive state in accordance with techniques herein. Without such a passive state, other alternatives may not be acceptable. For example, one alternative may be to set the device to not ready status. However, this may not be acceptable in that the device is not accessible at all even through other paths and such behavior may also cause an application to fail. As another alternative, the host port may be disabled or set to not ready status. However, this may also not be acceptable in that the host cannot access any devices through the port. Thus, such alternatives to using the techniques herein to set the path for the LUN to the passive state may result in additional undesirable and/or unacceptable behavior.

Figure 11:
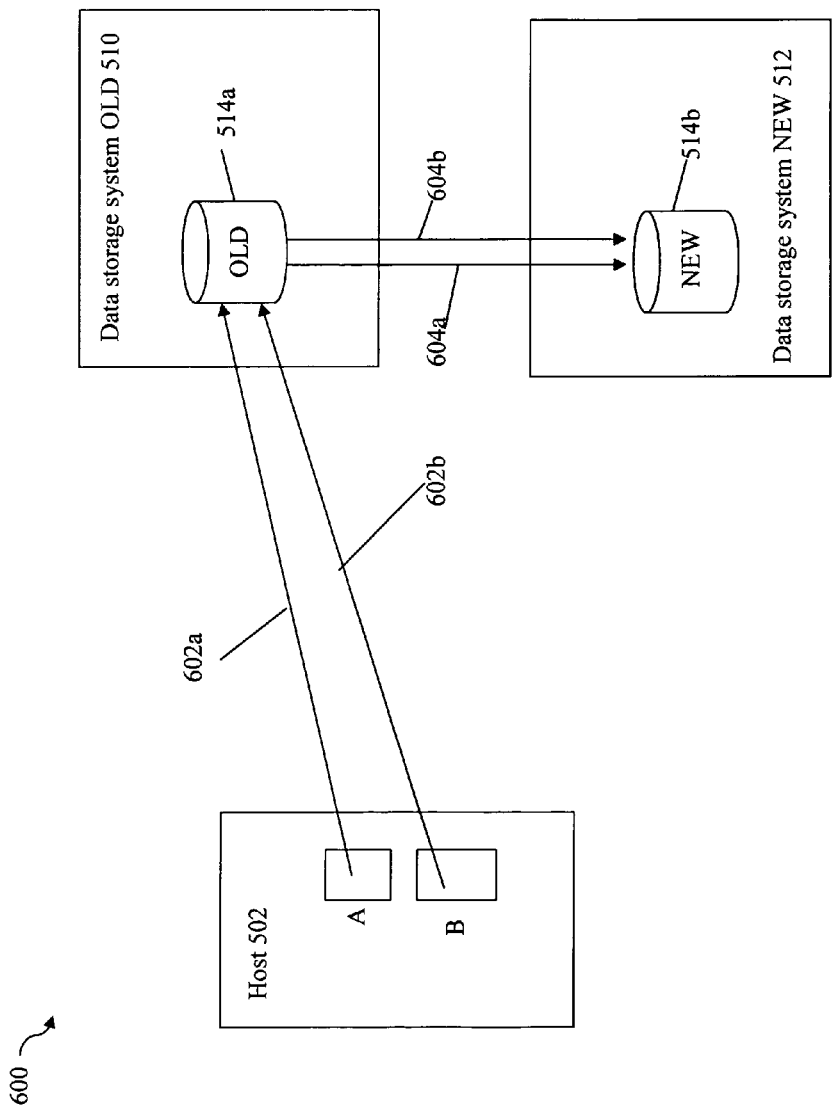

As yet another exemplary use, reference is made to FIG. 11 where migration of data from device 514a to device 514b is in progress. In this example, the host 502 may only have access to the device 514a and not 514b. The host may be performing I/O operations to device 514a over paths 602a and 602b while the migration is in progress. As part of the migration, data is copied over paths 604a and 604b to the device 514b. Additionally, data written to the device 514a may be automatically copied to the device 514b over one of the connections 604a, 604b. The migration session may be configured so that any data written over path 602a to device 514a is automatically copied to device 514b over path 604a, and any data written over path 602b to device 514a is automatically copied to device 514b over path 604b. During the migration, the connection for path 604b may fail. The migration may continue using path 604a. However, the next time a host writes to device 514a over path 602b, the migration processing attempts to also copy the write data automatically to the device 514b over path 604b. Since path 604b is down or unable to transmit I/O operations to the device 514b, the migration session may fail. It may be desirable to set path 602b to the passive state using techniques herein with respect to the device 514a. In this case, the host may be unable to issue I/O operations over path 602b and may only be able to use path 602a. However, the migration session may continue using 604a and will not fail due to the inability to automatically propagate write I/O data from device 514a to device 514b over configured path 604b.

Figure 12:
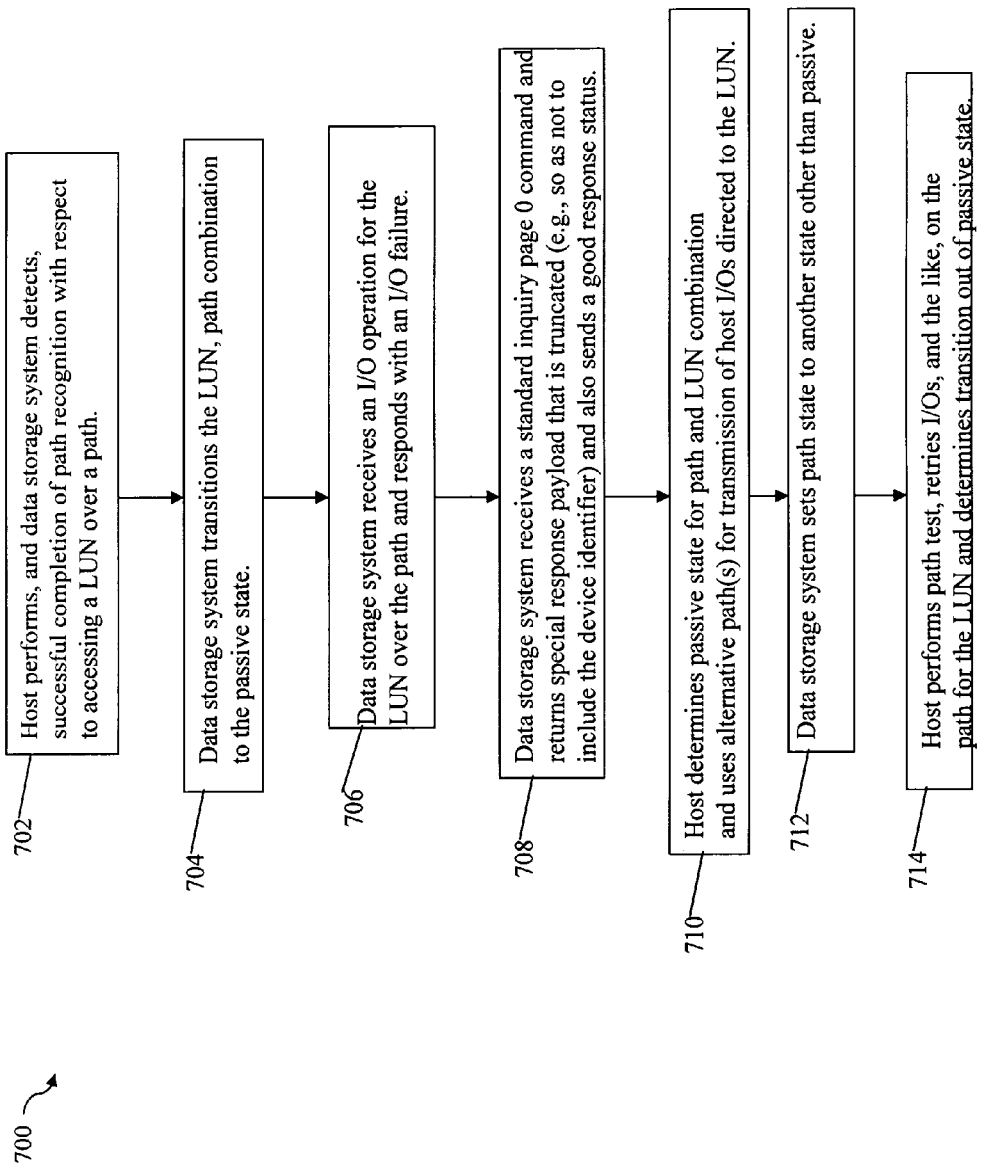
FIG. 12 is a flowchart of processing steps that may be performed in an embodiment in accordance with techniques herein.

Referring to FIG. 12, shown is a flowchart of processing steps as may be perform in an embodiment in accordance with techniques herein. The flowchart 700 summarizes processing described above. At step 702, the host performs, and the data storage system detects, successful completion of path recognition with respect to accessing a LUN over a path. As described above, the completion of path recognition may be based on detecting successful completion of a sequence of one or more expected commands issued by the host to the data storage system where such commands are those taken to recognize or establish a path for a particular LUN. At step 704, the data storage system may transition the path for the particular LUN to the passive state for any one or more different reasons and uses as may occur in an embodiment in accordance with techniques herein. At step 706, the data storage system receives an I/O operation for the LUN over the path and responds with an I/O failure. At step 708, the data storage system receives a standard inquiry page 0 command and returns the special response payload as described above that has a truncated length so as to truncate the message prior to the expected location or offset of the device identifier. The data storage system also sends a good response status indicating that the path is good. At step 710, the host determines the path to be in the passive state for the LUN and path combination based on the received response to the standard inquiry page 0 command. Some point in time later, step 712 may be performed where the data storage system sets the path state for the LUN to a state other than passive such as active allowing I/Os for the LUN on the path. At step 714, for the path previously determined as passive with respect to the LUN, the host may perform a path test (e.g. issue another standard inquiry page 0 command), retry sending I/Os over the path, and the like. The data storage system does not currently respond with failing the I/Os and does not return the special truncated payload in response to the standard inquiry page 0 command. Thus, the host determines the path to be active thereby determining the transition of the path for the particular LUN out of the passive state based on the status and response(s) received (e.g., based on receiving a response payload other than the special truncated payload, successful completion of I/Os for the device when sent on the path, and the like).

Although the foregoing is described with purposes of illustration with respect to the SCSI standard and particular commands thereof, LUNs, and the like, the techniques herein are more generally applicable for use with other standards and protocols, commands, logical devices, and the like.

It should be noted the representation of a passive state as described herein with respect to a combination of path and LUN may be communicated from the data storage system to the host or other initiator in a different manner such as, for example, in accordance with the ALUA. (Asymmetric Logical Unit Access) portion of the SCSI standard. However, the techniques herein may used in an embodiment which does not support ALUA.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for indicating a state associated with a device comprising:
    receiving a request over a path for information about a device;
    sending a response to said request, said response indicating a state regarding said device on said path, said response having a response status of good and having a payload of a varying size, said payload being truncated at a location prior to that at which a device, identifier for said device is expected; and
    determining, in accordance with said response having the payload truncated at a location prior to that at which the device identifier for the device is expected and having the response status of good, a state regarding said device on said path, said state indicating a passive status with respect to said device and said path thereby indicating that said path is not available for sending I/O operations to said device and available for use in performing control operations directed to said device.

2. The method of claim 1, wherein said device is a logical device.

3. The method of claim 1, wherein, in accordance with a standard, said response status is always required to indicate a status of good when a payload is returned in response to said request.

4. The method of claim 1, wherein said device identifier is determined using data included in one or more vendor defined fields in said request.

5. The method of claim 1, wherein, when said response payload is not truncated and includes a device identifier, said path is indicated as active and used to successfully process I/O operations directed to one or more other devices.

6. The method of claim 1, wherein, prior to sending said request from a host, said path is established as a recognized path for sending communications from said host to said device.

7. The method of claim 6, wherein a determination is made that said host has completed processing to establish said path as a recognized path in accordance with completion of one or more expected commands from said host.

8. The method of claim 7, wherein said one or more expected commands are performed as part of initially configuring connectivity between said host and a data storage system.

9. The method of claim 7, wherein said one or more expected commands are performed as part of discovery processing.

10. The method of claim 1, wherein said request is an inquiry command in accordance with a SCSI standard.

11. The method of claim 1, wherein said request includes an allocation length specifying a maximum possible length for said payload of said response, wherein said response returned has a payload with an actual size that is not larger than said allocation length.

12. The method of claim 11, wherein said response includes a value used to determine the actual size of said payload.

13. The method of claim 1, wherein there are multiple paths including said path used for transmitting commands from a host to a data storage system including said device, said host including an application and a driver, and the method includes:
sending an I/O request from said application to said driver including multipathing functionality, said I/O request being directed to said device;
sending, by said driver, said I/O request over said path to said device;
receiving, in response to said I/O request, an indication that said I/O request has failed;
sending said request over said path;
receiving said response;
determining, in accordance with said response, a passive state for said path and said device indicating that said path is currently not available for transmitting I/O operations to said device; and
selecting another of said multiple paths for transmitting said I/O operation to said device.

14. A system comprising:
a data storage system comprising a computer readable medium with code stored thereon for:
receiving a request over a path for information about a device; and
sending a response to said request, said response indicating a state regarding said device on said path, said response having a response status of good and having a payload of a varying size, said payload being truncated at a location prior to that at which a device identifier for said device is expected; and
a host comprising a computer readable medium with code stored thereon for:
sending said request;
receiving said response; and
determining, in accordance with said response having the payload truncated at a location prior to that at which the device identifier for the device is expected and having the response status of good, a state regarding said device on said path, said state indicating a passive status with respect to said device and said path thereby indicating that said path is not available for sending I/O operations to said device and available for use in performing control operations directed to said device.

15. A computer readable medium comprising code stored thereon for indicating a state associated with a device, the computer readable medium comprising code stored thereon for:
receiving a request over a path for information about a device;
sending a response to said request, said response indicating a state regarding said device on said path, said response having a response status of good and having a payload of a varying size, said payload being truncated at a location prior to that at which a device identifier for said device is expected; and
determining, in accordance with said response having the payload truncated at a Ideation prior to that at which the device identifier for the device is expected and having the response status of good, a state regarding said device on said path, said state indicating a passive status with respect to said device and said path thereby indicating that said path is not available for sending I/O operations to said device and available for use in performing control operations directed to said device.

16. The computer readable medium of claim 15, wherein said device is a logical device and, wherein, in accordance with a standard, said response status is always required to indicate a status of good when a payload is returned in response to said request.

17. The method of claim 1, wherein said path having the passive status with respect to the device has an active status with respect to a second device thereby indicating that said path is available for sending I/O operations and control operations to said second device at a same time the path is not available for sending I/O operations to the device which is healthy and operable.

18. The method of claim 1, wherein the path, when in the passive state with respect to the device, is only available for performing control operations directed to said device and the passive status with respect to the path and the device is communicated from a data storage system including the device to a host sending the request by the data storage system returning the response as a defined response to a particular command indicated by said request thereby allowing the host to detect the passive state for the device and the path combination based on the host receiving said defined response to the particular command.

19. The method of claim 18, wherein the control operations include an inquiry-command.

* * * * *

UNITED STATES PATENT AND TRADEMARK OFFICE
CERTIFICATE OF CORRECTION

PATENT NO. : 8,316,161 B1  
APPLICATION NO. : 12/924572  
DATED : November 20, 2012  
INVENTOR(S) : Cesareo Contreras et al.

Page 1 of 1

It is certified that error appears in the above-identified patent and that said Letters Patent is hereby corrected as shown below:

Title page, item (75) should read as follows:

(75) Inventors: Cesareo Contreras, Northbridge, MA (US);
Helen S. Raizen, Jamaica Plain, MA (US);
Michael E. Bappe, Loveland, CO (US);
Ian Wigmore, Westborough, MA (US);
Arieh Don, Newton, MA (US);
Xunce Zhou, Shrewsbury, MA (US)

Signed and Sealed this
First Day of January, 2013

David J. Kappos
*Director of the United States Patent and Trademark Office*